US012114625B2

(12) United States Patent
Schulte et al.

(10) Patent No.: US 12,114,625 B2
(45) Date of Patent: Oct. 15, 2024

(54) GREENHOUSE WITH NETTING SYSTEM

(71) Applicant: Holland Gaas B.V., Maasdijk (NL)

(72) Inventors: Marcel Johannes Gerardus Schulte, Maasdijk (NL); Roland Haaring, Maasdijk (NL)

(73) Assignee: HOLLAND GAAS B.V., Maasdijk (NL)

( * ) Notice: Subject to any disclaimer, the term of this patent is extended or adjusted under 35 U.S.C. 154(b) by 690 days.

(21) Appl. No.: 16/749,070

(22) Filed: Jan. 22, 2020

(65) Prior Publication Data

US 2021/0219502 A1    Jul. 22, 2021

(51) Int. Cl.
*E06B 9/52* (2006.01)
*A01G 9/24* (2006.01)

(52) U.S. Cl.
CPC .............. *A01G 9/241* (2013.01); *E06B 9/522* (2013.01); *E06B 2009/528* (2013.01)

(58) Field of Classification Search
CPC ....... E06B 2009/2625; E06B 2009/528; E06B 9/522; E06B 9/52; A01G 9/241; E05F 11/14; E05F 11/145; E05F 11/12
See application file for complete search history.

(56) References Cited

U.S. PATENT DOCUMENTS 1,432,135 A * 10/1922 Sylvan .................... E05F 11/12
                                                        49/113
1,778,354 A * 10/1930 Cannon .................. E05F 11/12
                                                        49/330

(Continued)

FOREIGN PATENT DOCUMENTS

EP    2532825 A2 * 12/2012 ............... E06B 9/52
EP    2730158 A1 *  5/2014 ............. A01G 9/242

(Continued)

OTHER PUBLICATIONS

Richel P; FR 2660151 machine translation; 1991; retrieved from https://worldwide.espacenet.com/publicationDetails/biblio?CC=FR&NR=2660151A1&KC=A1&FT=D&ND=3&date=19911004&DB=&locale=en_EP (Year: 1991).*

(Continued)

*Primary Examiner* — Abe Massad
(74) *Attorney, Agent, or Firm* — Workman Nydegger

(57) ABSTRACT

Greenhouse comprising a roof construction, wherein the roof construction comprises a slanting upper surface, a first framework that defines a roof opening, and a rectangular ventilation window that covers the roof opening, wherein the ventilation window comprises a panel and a second framework along at least a distal front edge and two parallel side edges of the panel, wherein the greenhouse comprises a netting system to prevent passage of insects through the ventilation passage, wherein the netting system comprises an insect netting that covers the ventilation passage and that is pleated in a bellow configuration to collapse in a stacked manner, and a guiding provision for the insect netting, wherein the guiding provision comprises an elongate guiding bow between the first framework and second framework that extends along the insect netting, wherein the insect netting is slidably connected with the elongate bow.

18 Claims, 5 Drawing Sheets

(56) References Cited

U.S. PATENT DOCUMENTS

| | | | | | |
|---|---|---|---|---|---|
| 1,858,977 | A | * | 5/1932 | Zech | B60H 1/26 |
| | | | | | 454/158 |
| 2,261,941 | A | * | 11/1941 | Persson | E06B 9/521 |
| | | | | | 160/84.04 |
| 5,433,663 | A | * | 7/1995 | Henningsson | D03D 9/00 |
| | | | | | 454/364 |
| 7,074,124 | B2 | * | 7/2006 | Williams | F24F 7/02 |
| | | | | | 47/17 |
| 7,568,307 | B1 | * | 8/2009 | Zimhoni | A01G 9/14 |
| | | | | | 47/17 |

FOREIGN PATENT DOCUMENTS

| | | | | | |
|---|---|---|---|---|---|
| FR | 2660151 | A | * | 10/1991 | A01G 9/241 |
| FR | 2808652 | A1 | * | 11/2001 | A01G 9/241 |
| NL | 9101777 | A | | 5/1992 | |
| NL | 9202011 | A | | 6/1994 | |
| NL | 2015156 | B1 | | 2/2017 | |

OTHER PUBLICATIONS

Search Report from Netherlands Patent Office Application No. NL2021356, Dated Mar. 26, 2019, 3 Pages.

* cited by examiner

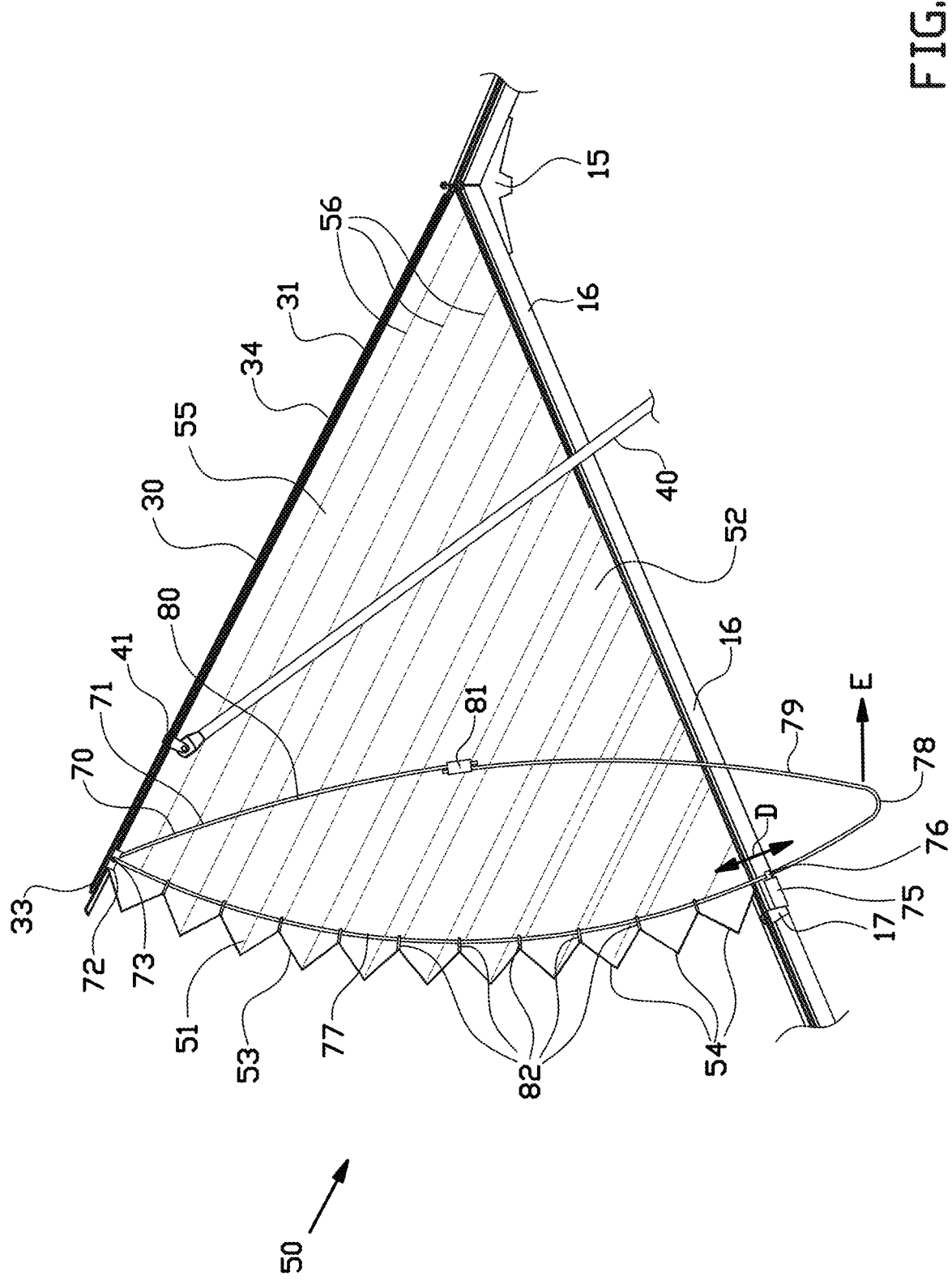

GREENHOUSE WITH NETTING SYSTEM

BACKGROUND

The invention relates to a greenhouse with hingeably connected ventilation windows in the roof construction. In the open position the ventilation windows leave a ventilation passage open. In order to prevent passage of insects through the ventilation passage, a netting system may be provided.

The netting system known from NL2015156 has a bellow shaped insect netting comprising a front panel that merges into two side panels towards the hinge. The insect netting collapses in a stacked manner when the ventilation window is swung into its closed position.

SUMMARY OF THE INVENTION

The insect netting of the known netting system might bulge out or collapse back into the ventilation passage as it is exposed to wind and gravity. This might be problematic, in particular when the ventilation window is closed, as that might hinder that the insect netting orderly collapses in a stacked manner.

It is an object of the present invention to provide a greenhouse with a netting system having an insect netting that collapses orderly in a stacked manner even when exposed to wind.

The invention provides a greenhouse comprising a roof construction, wherein the roof construction comprises a slanting upper surface, a first framework that defines a roof opening, and a rectangular ventilation window that covers the roof opening, wherein the ventilation window is hingeably connected with the first framework to hinge around a hinge axis between a closed position in which the ventilation window extends substantially parallel to the upper surface and an open position in which the ventilation window is oriented oblique with respect to the upper surface to form a ventilation passage, wherein the ventilation window comprises a panel and a second framework along at least a distal front edge and two parallel side edges of the panel, wherein the greenhouse comprises a netting system to prevent passage of insects through the ventilation passage, wherein the netting system comprises an insect netting between the first framework and the second framework that covers the ventilation passage and that is pleated in a bellow configuration to collapse in a stacked manner, and a guiding provision for the insect netting, wherein the guiding provision comprises an elongate guiding bow between the first framework and second framework that has a curvature around the hinge axis and that extends along the insect netting, wherein the insect netting is slidably connected with the guiding bow.

The greenhouse according to the invention comprises a ventilation window and a netting system having a pleated insect netting that collapses in a stacked manner, and a guiding provision having an elongate guiding bow with a curvature around the hinge axis to which the insect netting is slidably connected. The guiding provision thereby guides the pleated insect netting when it collapses, whereby the insect netting can be stacked orderly during it collapse even when it is exposed to wind.

In an embodiment the guiding bow has a constant radius with respect to the hinge axis, whereby it is ensured that the pleats land straight above each other when the ventilation window is closed.

In an embodiment the guiding bow is suspended from the second framework, whereby it is hoisted up and lowered down together with the movement of the ventilation window.

In an embodiment the guiding bow is hingeably connected with the second framework.

In an embodiment the guiding bow is slidably connected with the first framework, whereby its position with respect to the insect netting during the movement of the ventilation window is ensured.

In an embodiment the guiding bow tilts to the hinge axis when the ventilation window hinges from the open position to the closed position, whereby it is prevented that the guiding bow hits other components of the greenhouse.

In an embodiment the guiding bow extends along the inner side of the insect netting.

In an embodiment the guiding bow extends at least partially through the roof opening, whereby the section of the guiding bow that is not in use is parked, for example when the ventilation window is only slightly opened.

In an embodiment the insect netting comprises a series of bellow sections that are connected to each other, wherein multiple bellow sections that are distributed along the guiding bow are slidably connected with the guiding bow. The distributed connection ensures that the insect netting is guided along it entire exposed height.

In an embodiment the guiding provision comprises a series of hooks, brackets or eyes with an opening that are attached to the insect netting, wherein the guiding bow extends slidably through the opening. The hooks, brackets or eyes may be attached when an insect netting is provided with the guiding provision.

In an embodiment the guiding bow comprises an elongate rod, bar, profile, wire or tube having the curvature.

In a practical embodiment the elongate rod, bar, profile, wire or tube has a thickness of 2-50 millimeters, preferably 2-30 millimeters, most preferably 2-10 millimeters.

In an embodiment the guiding bow is made of metal, that can be given the desired curvature by bending.

In a preferred embodiment thereof, the guiding bow is made of aluminium, steel or stainless steel.

In an embodiment the guiding provision comprises a stiffening that is connected with the ends of the guiding bow and that extends freely from the guiding bow between the ends of the guiding bow. The stiffening may ensure that the guiding bow maintains its curvature even when the insect netting is exposed to wind.

In an embodiment thereof the stiffening comprises an elongate counter bow.

In an embodiment the stiffening comprises an elongate rod, bar, profile, wire or tube.

In a practical embodiment the elongate rod, bar, profile, wire or tube has a thickness of 2-50 millimeters, preferably 2-30 millimeters, most preferably 2-10 millimeters.

In an embodiment the stiffening is made of metal, that can be given a desired curvature by bending.

In a preferred embodiment thereof, the stiffening is made of aluminium, steel or stainless steel.

In an embodiment the guiding bow and the stiffening are a form stable assembly or unity that can be installed in one operation.

In an embodiment the insect netting comprises a front panel merging into two side panels, wherein the front panel of the insect netting is slidably connected with the guiding bow. This front panel is most exposed to wind.

In an embodiment thereof the side panels extend transverse to the hinge axis of the glass panel.

In an embodiment the insect netting comprises elongate gauze webs that are connected to each other along a longitudinal outer edge thereof.

In an embodiment the gauze webs comprise a woven textile with warp threads and crossing weft threads that alternatingly go over and under the consecutive warp threads, wherein the warp threads and the weft threads each comprise at least one strand.

In an embodiment thereof the strand is formed with a plastic resin.

In a particular embodiment thereof the plastic resin is a polyolfin.

In particular, the plastic resin is polyethylene, polypropylene or polyester.

In an alternative embodiment the strand is a glass fibre.

In an embodiment the panel is a translucent panel, in particular a transparent panel, to allow entrance of light into the greenhouse.

In an embodiment the panel is a glass panel.

In a particular embodiment the panel is a hardened glass panel. A hardened glass panel may have sufficient strength to carry its own weight and sufficient stiffness to remain in it shape without the need for a rigid framework around its entire circumference, whereby the second frame may have minimal dimensions, or be made of plastic for example.

In a further alternative embodiment, the panel is a plastic panel, such as polycarbonate.

The invention is furthermore related to a guiding provision suitable for the greenhouse according to the invention.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached drawings, in which:

FIG. 3 is a cross section the ventilation window with the netting system as shown in FIGS. 2A and 2B.

DETAILED DESCRIPTION OF THE INVENTION

Figure 1:
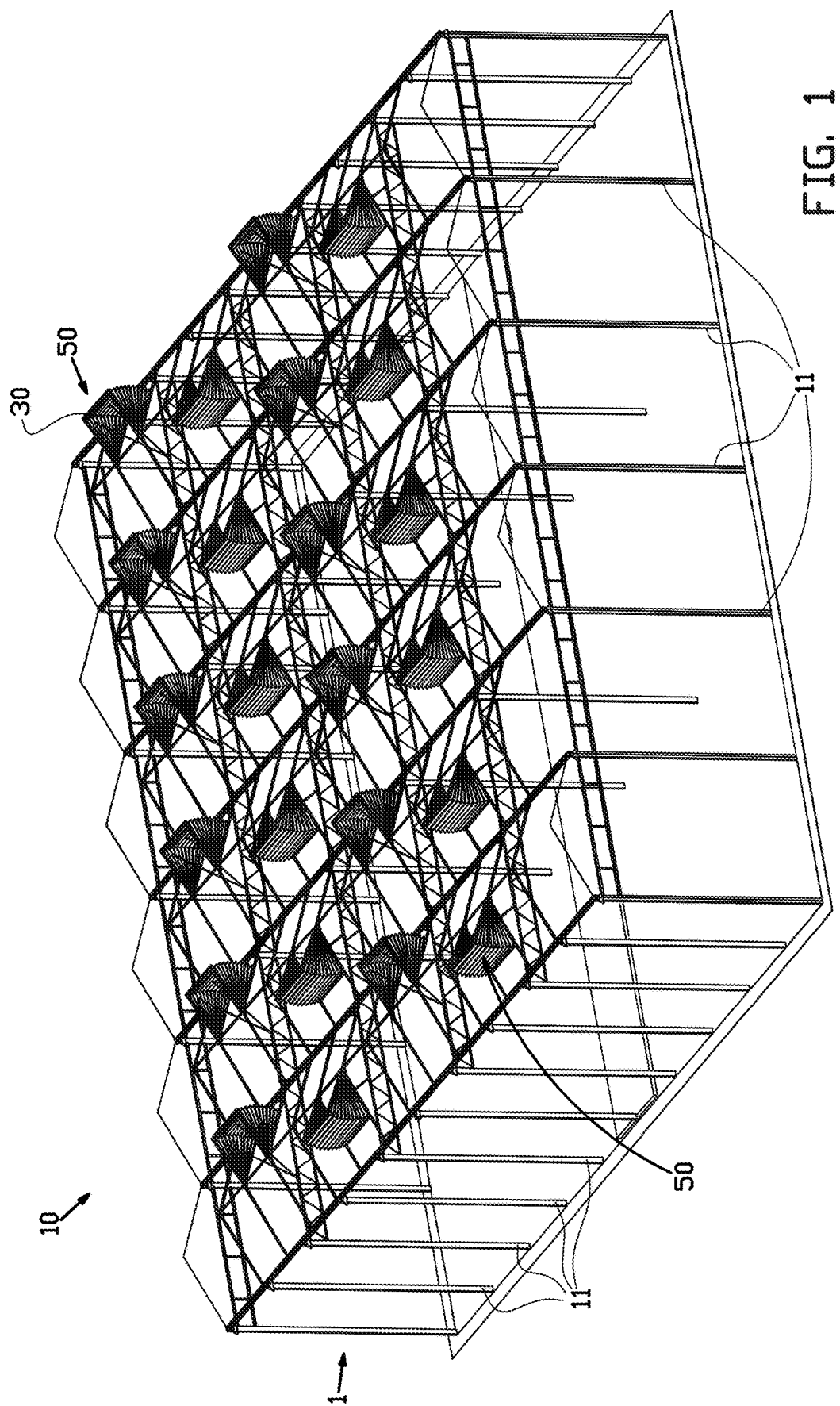
FIG. 1 is an isometric view of a greenhouse with a roof having ventilation windows with a netting system according to an embodiment of the invention.
Figure 2A:
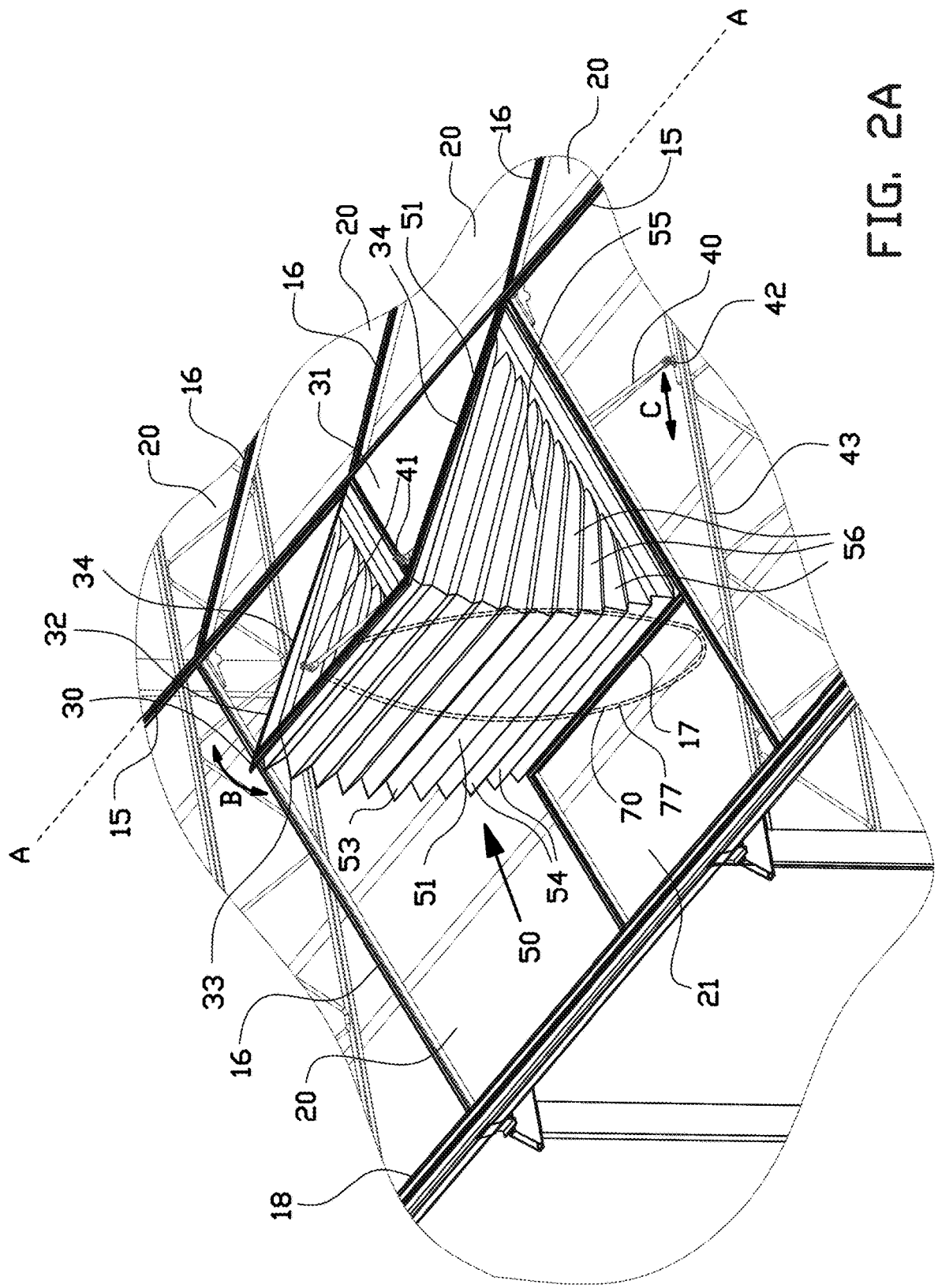
FIGS. 2A and 2B are isometric views, one with a partial cut-out, of one of the ventilation windows with the netting system of FIG. 1.
Figure 2B:
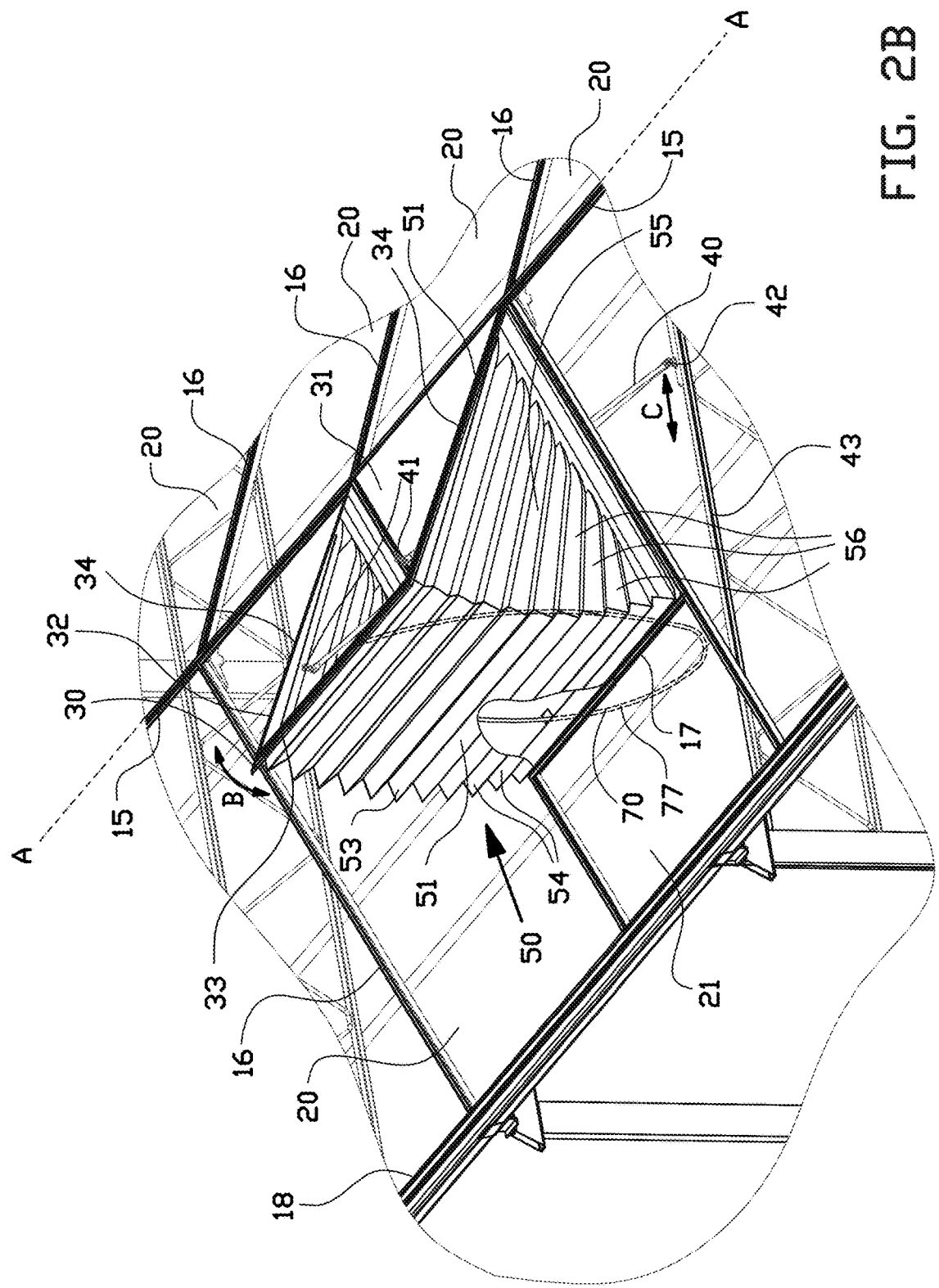

FIGS. 1, 2A and 2B show a greenhouse 1 of the Venlo type. The greenhouse 1 comprises a roof construction 10 that is supported by multiple parallel rows of vertical columns 11. The roof construction 10 comprises multiple parallel roof ridge profiles 15 and lower rain gutter profiles 18 that are interconnected with slanting window profiles 16. The profiles 15, 16, 18 form rectangular rabbets for fixed glass panels 20 that for the slanting upper surface of the roof construction.

The roof construction 10 furthermore comprises regularly distributed ventilation windows 30 that at the upper side are hingeably connected with the roof ridge profiles 15. As shown in FIGS. 2A and 2B the ventilation windows 30 are in this example shorter than the fixed glass panels 20. Therefore, a horizontal window profile 17 is mounted between the two adjacent slanting window profiles 16 of each ventilation window 30 to form a rabbet for an additional fixed glass panel 21 below the ventilation window 20. The roof ridge profiles 15, the slanting window profiles 16 and the horizontal window profiles 17 together form first frameworks that define roof openings in the roof construction 10. The profiles 15, 16, 17, 18 are made of metal, in particular aluminum.

The ventilation windows 30 comprise a translucent glass panel 31 and a second framework 32 along the free edges of the glass panel 31. The glass panel 31 is transparent to allow light to enter the greenhouse 1. In this example the glass panel 31 is of hardened glass, whereby the glass panel 31 has sufficient strength to carry its own weight and sufficient stiffness to remain in it shape without the need for a rigid framework around its entire circumference. Alternatively, a plastic panel is applied, such as a polycarbonate panel. In this example the second framework 32 has a front profile 33 along the free distal edge of the glass panel 31, and two side profiles 34 along the parallel side edges of the glass panel 31.

Each ventilation window 30 can swing around its hinge axis A in direction B between the open position as shown in FIG. 2, and a closed position to regulate the ventilation of the greenhouse 1. In the closed position the second framework 32 rests on the window profiles 16, 17. The ventilation windows 30 are swung in direction B by in this example two push rods 40 having distributed connections 41 in the hardened glass panels 30 and a common connection with a slide 42 that can move in direction C along a horizontal rail 43 of the roof construction 10 by means of an electromotor.

The ventilation windows 30 are each provided with a netting system 50 to prevent passage of insects when the ventilation windows 30 are in the open position. These can be harmful insects that have to be kept outside the greenhouse 1 or specific insects that are held inside the greenhouse 1. The netting system 50 comprises an insect netting 51 of fine mesh plastic gauze 52 that extends in the ventilation passage between the roof construction 10 and the ventilation window 30. The insect netting 51 is pleated in a bellow configuration in order to stack when it collapses. At the upper side the insect netting 51 is connected with the second framework 32, for example by stitching, and at the lower side the insect netting 51 is connected to the corresponding window profiles 16, 17 along the roof opening that form the first framework. The insect netting 51 comprises a front panel 53 having multiple front pleats or front bellow sections 54 below the front profile 33, and two side panels 55 having multiple side pleats or side bellow sections 56. The front bellow sections 54 merge at their ends into the side bellow sections 56 below the side profiles 34. The bellow sections 53, 54 are stacked straight above each other when the ventilation window 30 is in the closed position.

As shown in FIGS. 2A, 2B and 3, the netting system 50 comprises a guiding provision 70 for the insect netting 51. As best shown in FIG. 3, the guiding system 70 comprises a bow assembly 71 that is made of a metal rod, bar, profile, wire or tube, having in this example a thickness of about 5 millimeter, that is bend in the shown configuration. The guiding provision 70 comprises a mounting piece 72 that is in this example made of metal and that is mounted to the front profile 33 of the framework 32. The bow assembly 71 is at its top side hingeably connected with the mounting piece 72.

The bow assembly 71 comprises an elongate guide bow 77 that is convex towards the front panel 53. The guide bow 77 has a curvature with a practical constant radius around the hinge axis A of the ventilation window 30. The guide bow 77 extends at equal distances to the front bellow sections 56. The guide bow 77 continues at its top side into a not shown hinge rod that extends perpendicular to the guide bow 77 and that extends loosely through an aperture 73 in the mounting piece 72. At the opposite side this hinge rod continues into an upper connecting section 80. The guide bow 77 continues at its bottom side via a sharper V-curvature 78 into a lower connecting section 79. The connecting sections 79, 80 are at their meeting ends rigidly attached to each other, in this example by means of a metal clamp 81 that is closed against the overlapping ends. The joint connecting sections 79, 80 together form a stiffening or reinforcement in the form of a counter bow that is concave towards the front bellow sections 54, having a curvature with about the same radius as the guide bow 77. The joint connecting sections 79, 80 provide rigidity to the guide bow 77. The entire bow assembly 71 is a form stable assembly or unity.

The guiding system 70 comprises a guide piece 75 that is in this example made of metal and that is mounted to the window profile 17. The guide piece 75 has an aperture 76 through which the guide bow 77 loosely extends to slide there through in direction D. The guiding provision 70 comprises multiple brackets 82 that are attached to the front bellow sections 54. The brackets 82 have an opening through which the guide bow 77 slidably extends. In this example a bracket 82 is attached to each front bellow section 54, but it is also possible to distribute less the brackets 82 over the bellow sections 54, for example by alternating.

Figure 4:
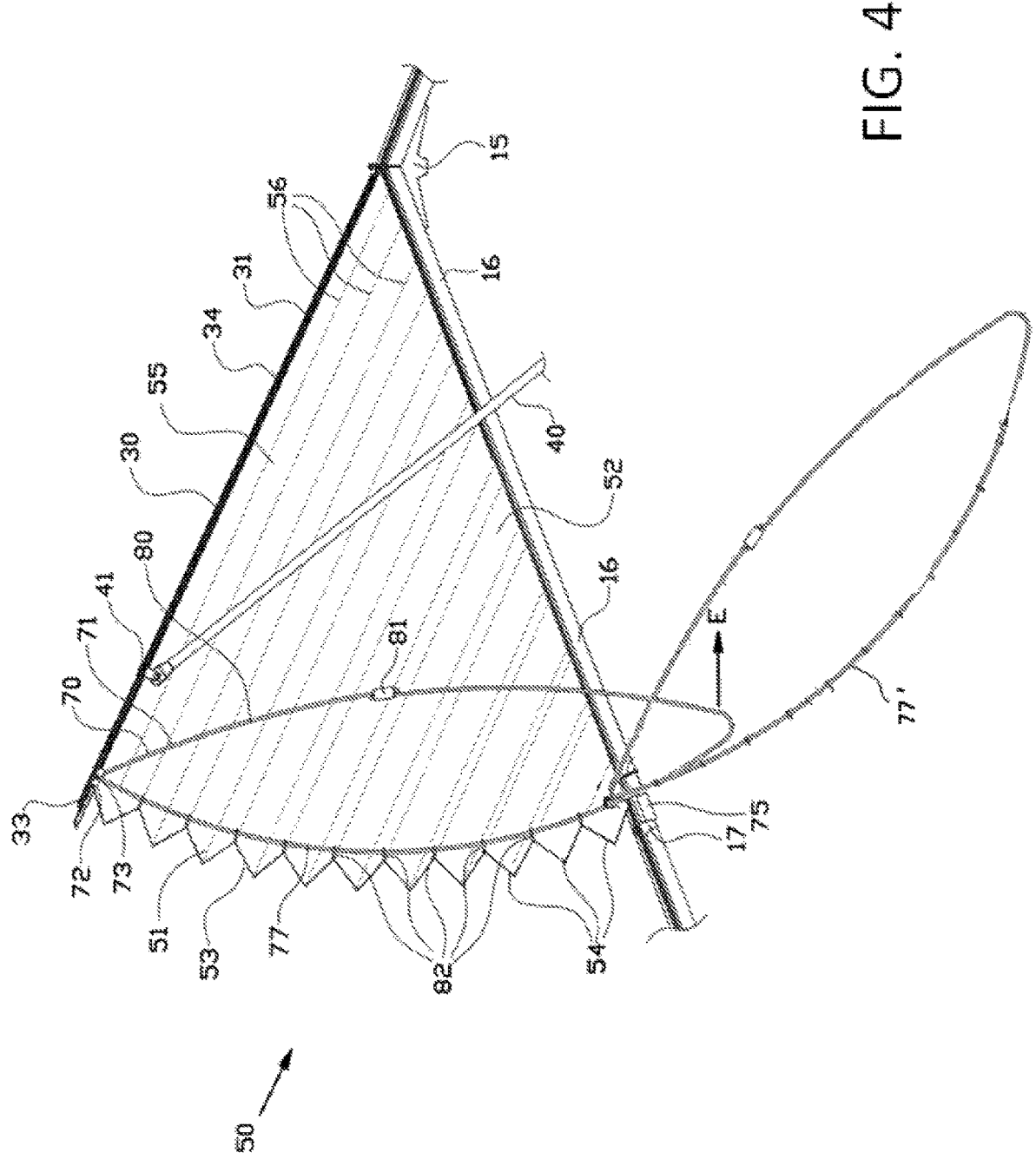
FIG. 4 is a cross section similar to that shown in FIG. 3, but showing the tilt or swing of an elongated guide bow.

The guide bow 77 supports the front bellow sections 54 in their sideward direction in any open position of the ventilation window 30. Thereby it is prevented that the unfolded front bellow sections 54 bulge out from or collapse back into the ventilation passage when they are exposed to strong wind for example. The guide bow 77 guides the front bellow sections 54 when the ventilation window is closed in direction B, wherein the guide bow 77 slides through the aperture 76 after the subsequent front bellow sections 54 have landed onto the horizontal window profile 17. The aperture 73 provides a hinge axis for the bow assembly 71 with regard to the second framework 32. In practice, the distance d1 of the aperture 73 of guide piece 75 with respect to the hinge axis A might slightly deviate, in particular be slightly shorter than the distance d2 of the aperture 76 of the mounting piece 72 with respect to the hinge axis A. This small deviation urges the bow assembly 71 to tilt or swing in direction E towards the hinge axis A when the ventilation window 30 is closed, as shown by the tilt or swing in the direction E of elongated guide bow 77' in FIG. 4. Between the open position and the closed position of the ventilation window the bow assembly 71 tilts or swings preferably over more than 10 degrees, more preferably more than 30 degrees around the aperture 73. In this manner it is prevented that the bow assembly 71 downwardly hits other components of the greenhouse 1 that are carried by the roof construction 10, such as horizontally extending screens.

In this example the guiding provision 70 is applied to the front bellow sections 54. The guiding provision 70 can on the same way be applied to the side bellow sections 56, wherein the mounting piece 72 and the guide piece 75 are mounted to the side profiles 34 and the corresponding slanting window profiles 16, and the brackets 82 are attached to the side bellow sections 56.

It is to be understood that the above description is included to illustrate the operation of the preferred embodiments and is not meant to limit the scope of the invention. From the above discussion, many variations will be apparent to one skilled in the art that would yet be encompassed by the spirit and scope of the present invention.

The invention claimed is:

1. A greenhouse comprising a roof construction,
wherein the roof construction comprises a slanting upper surface, a first framework that defines a roof opening, and a rectangular ventilation window that covers the roof opening,
wherein the ventilation window is hingeably connected with the first framework to hinge around a first hinge axis between a closed position in which the ventilation window extends substantially parallel to the upper surface and an open position in which the ventilation window is oriented oblique with respect to the upper surface to form a ventilation passage,
wherein the ventilation window comprises a panel and a second framework along at least a distal front edge and two parallel side edges of the panel,
wherein the greenhouse comprises a netting system to prevent passage of insects through the ventilation passage,
wherein the netting system comprises an insect netting between the first framework and the second framework that covers the ventilation passage and that is pleated in a bellow configuration to collapse in a stacked manner, and a guiding provision for the insect netting,
wherein the guiding provision comprises an elongate guiding bow between the first framework and second framework that has a curvature around the first hinge axis and that extends along the insect netting,
wherein the insect netting is slidably connected with the guiding bow,
wherein the guiding bow is suspended from the second framework,
wherein the guiding bow is hingeably connected with the second framework,
wherein the guiding bow is slidably connected with the first framework, and
wherein the guiding bow tilts toward the first hinge axis when the ventilation window hinges from the open position to the closed position,
wherein the guiding bow is hingeably connected with the second framework at a second hinge axis,
wherein the guiding bow is slidably connected with the first framework by a guide piece of the first framework, and
wherein a distance between the guide piece and the first hinge axis of the ventilation window is shorter than a distance between the second hinge axis and the first hinge axis of the ventilation window such that in the closed position of the ventilation window a longitudinal axis of the guide bow is directed downwardly from the ventilation window.

2. The greenhouse according to claim 1, wherein the guiding bow has a constant radius with respect to the first hinge axis.

3. The greenhouse according to claim 1, wherein the guiding bow extends along the inner side of the insect netting.

4. The greenhouse according to claim 1, wherein the guiding bow extends at least partially through the roof opening.

5. The greenhouse according to claim 1, wherein the insect netting comprises a series of bellow sections that are connected to each other, wherein a plurality of the bellow sections are distributed along the guiding bow and are slidably connected with the guiding bow.

6. The greenhouse according to claim 1, wherein the guiding provision comprises a series of hooks, brackets or eyes that are attached to the insect netting, each of the series of hooks, brackets, or eyes having a respective opening, and
wherein the guiding bow extends slidably through the respective openings of the series of hooks, brackets, or eyes.

7. The greenhouse according to claim 1, wherein the guiding bow comprises an elongate rod, bar, profile, wire or tube having the curvature.

8. The greenhouse according to claim 1, wherein guiding bow is made of metal.

9. The greenhouse according to claim 1, wherein the guiding provision comprises a stiffening that is connected with ends of the guiding bow and that extends freely from the guiding bow between the ends of the guiding bow.

10. The greenhouse according to claim 9, wherein the stiffening comprises an elongate counter bow.

11. The greenhouse according to claim 10, wherein the stiffening comprises an elongate rod, bar, profile, wire or tube.

12. The greenhouse according to claim 9, wherein the stiffening is made of metal.

13. The greenhouse according to claim 9, wherein the guiding bow and the stiffening are a form stable assembly or unity.

14. The greenhouse according to claim 1, wherein the insect netting comprises a front panel merging into two side panels,
wherein the front panel of the insect netting is slidably connected with the guiding bow.

15. The greenhouse according to claim 1, wherein the insect netting comprises elongate gauze webs that are connected to each other along a longitudinal outer edge thereof.

16. The greenhouse according to claim 15, wherein the gauze webs comprise a woven textile with warp threads and crossing weft threads that alternatingly go over and under the consecutive warp threads,
wherein the warp threads and the weft threads each comprise at least one strand.

17. The greenhouse according to claim 1, wherein the guiding bow is hingeably connected with the second framework at a second hinge axis, and
the guiding bow tilts toward the first hinge axis of the ventilation window more than 10 degrees when the ventilation window hinges from the open position to the closed position.

18. A netting system to prevent passage of insects through a ventilation passage of a roof construction of greenhouse,
the netting system comprises an insect netting configured to be provided between a first framework of the roof construction and a second framework of a ventilation window hingeably connected with the first framework, the second framework being configured to hinge around a first hinge axis between a closed position in which the ventilation window extends substantially parallel to the upper surface and an open position in which the ventilation window is oriented oblique with respect to the upper surface to form the ventilation passage,
wherein the insect netting is configured to cover the ventilation passage and is pleated in a bellow configuration to collapse in a stacked manner,
the netting system further comprising a guiding provision for the insect netting,
wherein the guiding provision comprises an elongate guiding bow between the first framework and second framework that has a curvature around the first hinge axis and that extends along the insect netting,
wherein the insect netting is slidably connected with the guiding bow,
wherein the guiding bow is suspended from the second framework,
wherein the guiding bow is hingeably connected with the second framework,
wherein the guiding bow is slidably connected with the first framework, and
wherein the guiding bow tilts toward the first hinge axis when the ventilation window hinges from the open position to the closed position,
wherein the guiding bow is hingeably connected with the second framework at a second hinge axis,
wherein the guiding bow is slidably connected with the first framework by a guide piece of the first framework, and
wherein a distance between the guide piece and the first hinge axis of the ventilation window is shorter than a distance between the second hinge axis and the first hinge axis of the ventilation window such that in the closed position of the ventilation window a longitudinal axis of the guide bow is directed downwardly from the ventilation window.

* * * * *